United States Patent
Wang et al.

(10) Patent No.: US 11,673,119 B2
(45) Date of Patent: Jun. 13, 2023

(54) PREPARATION METHOD AND APPLICATION OF METAL BISMUTH DEPOSITED BISMUTH-BASED PHOTOCATALYST

(71) Applicant: Shaanxi University of Science and Technology, Xi'an (CN)

(72) Inventors: Chuanyi Wang, Xi'an (CN); Qiuhui Zhu, Xi'an (CN); Ting Gao, Xi'an (CN)

(73) Assignee: Shaanxi University of Science & Technology, Xi'an (CN)

(*) Notice: Subject to any disclaimer, the term of this patent is extended or adjusted under 35 U.S.C. 154(b) by 32 days.

(21) Appl. No.: 17/146,983

(22) Filed: Jan. 12, 2021

(65) Prior Publication Data
US 2022/0062865 A1    Mar. 3, 2022

(30) Foreign Application Priority Data
Aug. 31, 2020    (CN) .......................... 202010898905.0

(51) Int. Cl.
| | | |
|---|---|---|
| B01J 23/00 | (2006.01) | |
| B01J 23/18 | (2006.01) | |
| B01D 53/86 | (2006.01) | |
| B01J 35/00 | (2006.01) | |
| B01J 35/06 | (2006.01) | |
| B01J 37/04 | (2006.01) | |
| B01J 37/06 | (2006.01) | |
| B01J 37/10 | (2006.01) | |
| B01J 37/16 | (2006.01) | |

(52) U.S. Cl.
CPC .......... *B01J 23/18* (2013.01); *B01D 53/8628* (2013.01); *B01J 35/004* (2013.01); *B01J 35/06* (2013.01); *B01J 37/04* (2013.01); *B01J 37/06* (2013.01); *B01J 37/10* (2013.01); *B01J 37/16* (2013.01); *B01D 2255/2096* (2013.01); *B01D 2255/20707* (2013.01); *B01D 2255/40* (2013.01); *B01D 2255/802* (2013.01)

(58) Field of Classification Search
None
See application file for complete search history.

(56) References Cited

U.S. PATENT DOCUMENTS

| | | | | |
|---|---|---|---|---|
| 8,062,991 | B2 * | 11/2011 | Male ........................ | B01J 23/28 502/220 |
| 2003/0054193 | A1 * | 3/2003 | McCollum ........... | C09D 5/4473 428/626 |

OTHER PUBLICATIONS

Bao et al, Hydrothermal synthesis of Bi@Bi4Ti3O12 nanosheets with enhanced visible-light photocatalytic activity, CrystEngComm, 2020,22, 6316-6321, Aug. 17, 2022 (Year: 2022).*

(Continued)

*Primary Examiner* — Stefanie J Cohen
(74) *Attorney, Agent, or Firm* — Thorpe North & Western, LLP (57) ABSTRACT

A method of forming a bismuth-based catalyst can include mixing an inorganic alkali compound, a bismuth source compound, a transition metal precursor, and a reducing agent in an aqueous solution to form a bismuth precursor liquid. The bismuth precursor liquid can be hydrothermally reacted at a conversion temperature for a conversion time to produce the bismuth-based catalyst.

15 Claims, 3 Drawing Sheets

(56) References Cited

OTHER PUBLICATIONS

Dong et al.; "Noble Metal-Like Behavior of Plasmonic Bi Particles as a Cocatalyst Deposited on $(BiO)_2CO_3$ Microspheres for Efficient Visible Light Photocatalysis." ACS Catalysis; ACS Publications; Oct. 30, 2014; vol. 4; pp. 4341-4350.

Dong et al.; "Pt Quantum Dots Deposited on N-Doped $(BiO)_2CO_3$: Enhanced Visible Light Photocatalytic No Removal and Reaction Pathway." Catalysis Science & Technology; Royal Society of Chemistry; 2017; vol. 7; pp. 1324-1332.

He et al.; "Activation of amorphous $Bi_2WO_6$ with synchronous Bi metal and $Bi_2O_3$ coupling: photocatalysis mechanism and reaction pathway." Applied Catalysis B: Environmental; Sep. 15, 2018; vol. 232; pp. 340-347.

He et al.; "Defective $Bi_4MoO9$/Bi Metal core/shell heterostructure: Enhanced visible light photocatalysis and reaction mechanism." Applied Catalysis B: Environmental 239 (2018); pp. 619-627.

He et al.; "Size controllable synthesis of single-crystal ferroelectric $Bi_4Ti_3O_{12}$ nanosheet dominated with {0 0 1} facets toward enhanced visible-light-driven photocatalytic activities." Applied Catalysis B: Environmental 156-157 (2014); Elsevier; pp. 35-43.

Hu et al.; "Z-Scheme 2D/2D Heterojunction of Black Phosphorus/ Monolayer $Bi_2WO_6$ Nanosheets with Enhanced Photocatalytic Activities." Angewandte Chemie International Edition; 2019; vol. 58, Issue 7; pp. 2073-2077.

Khan et al.; "Surface Plasmon-Based Nanomaterials as Photocatalyst." Advanced Nanostructured Materials for Environmental Remediation; Environmental Chemistry for a Sustained World, vol. 25; Springer; 2019; pp. 173-187.

Ma et al.; "Synthesis and enhanced photoreactivity of metallic Bi-decorated BiOBr composites with abundant oxygen vacancies." J Mater Sci: Mater Electron; Online Sep. 14, 2015; 10 Pages.

Li et al.; "Transformation pathway and toxic intermediates inhibition of photocatalytic No removal on designed Bi metal@defective $Bi_2O_2SiO_3$." Applied Catalysis B: Environmental 241 (2019) 187-195.

Sun et al.; "Plasmonic Bi metal as cocatalyst and photocatalyst: The case of Bi/$(BiO)_2CO_3$ and Bi particles." Journal of Colloid and Interface Science 485 (2017); Elsevier; pp. 1-10.

Wang et al.; "$Bi_4Ti_3O_{12}$ synthesized by high temperature solid phase method and it's visible catalytic activity." Elsevier; Procedia Environmental Sciences 18 (2013) 547-558.

Xu et al.; "Glucose-Induced Formation of Oxygen Vacancy and Bi-metal Comodified $Bi_5O_7Br$ Nanotubes for Efficient Performance Photocatalysis." ACS Sustainable Chemistry & Engineering; ACS Publications; Feb. 5, 2019; vol. 7; pp. 5784-5791.

Zhao et al.; "Highly Selective Oxidation of Glycerol over Bi/$Bi_{3.64}Mo_{0.36}O_{6.55}$ heterostructure: Dual Reaction Pathways Induced by Photogenerated $^1O_2$ and Holes." Applied Catalysis B: Environmental; May 5, 2019; vol. 244; pp. 206-214.

Zhao et al.; "Noble Metal-Free Bi Nanoparticles Supported on $TiO_2$ with Plasmon-Enhanced Visible Light Photocatalytic Air Purification." Environmental Science: Nano; RSC Publishing; Issue 6, 2016; 13 Pages.

Zhou et al.; "Oriented $Bi_2WO_6$ Photocatalyst induced by In Situ Bi Reduction towards Efficient Nitrogen Fixation." Catal. Sci. Technol. 2019; 7 Pages.

\* cited by examiner

PREPARATION METHOD AND APPLICATION OF METAL BISMUTH DEPOSITED BISMUTH-BASED PHOTOCATALYST

RELATED APPLICATION

This application claims priority to Chinese Patent Application No. 202010898905.0, filed Aug. 31, 2020, titled "Preparation Method and Application of Metal Bismuth Deposited Bismuth-Based Photocatalyst," which is incorporated herein by reference.

BACKGROUND

With the development of modern industry and the continuous increase in usage of motor vehicles, more and more nitrogen oxides ($NO_x$) are emitted into the atmosphere. This increase can break the balance of the natural nitrogen cycle, causing acid rain, haze, photochemical smog, and ozone layer destruction, contribute to the greenhouse effect and other harsh environmental problems. Notably, about 95% of $NO_x$ is nitric oxide (NO). When the NO concentration is lower than 1 ppm, its reaction rate with oxygen is greatly slowed down, which seriously harms the living environment, and it is difficult for traditional methods to remove trace (ppb level) $NO_x$ in the air.

Photocatalytic technology based on semiconductor materials can convert low concentrations of NO into non-toxic products and thus mitigate its harm. Under the irradiation of sunlight, electrons and holes are generated by photocatalytic materials, thus producing a variety of active oxygen species to undergo redox reactions with NO in the air and thereby converting them into $NO_3^-$, $NO_2^-$, $N_2$, $O_2$ and other products. Therefore, such photocatalytic methods can efficiently remove low concentration NO and has the characteristics of low cost and environmental friendliness. However, there are still some remaining issues that limit the practical application of photocatalytic technology. For example, narrow light absorption range and high recombination probability of electrons and holes generated in semiconductors upon irradiation are two major issues.

Depositing metal particles with surface plasmon resonance (SPR) effect on the surface of the photocatalyst cannot only broaden the light absorption range, but also act as an electron acceptor to enable the semiconductor photogenerated carriers to be effectively separated and reduce the probability of carrier recombination, which is a common method to improve light quantum efficiency. However, mainly precious metals such as Au, Ag etc. are widely used in the field of plasmonic photocatalysis, which unavoidably has the disadvantage of high cost. In addition, most loadings of metals with SPR effect require more than two steps to achieve. Meanwhile, the efficiency of visible light conversion of low concentration NO is low, and the production of $NO_2$ is high. These factors further limit its practical application.

SUMMARY

The invention discloses a preparation method and application of metal bismuth deposited bismuth-based photocatalyst. The metal bismuth deposited bismuth-based photocatalyst can be prepared by a one-step hydrothermal method, where an added reducing agent makes bismuth with surface plasmon resonance (SPR) deposit on the surface of the photocatalyst. The developed preparation method of the invention is simple, and the raw materials are cheap and easy to obtain. The prepared photocatalytic material has high NO photocatalytic removal efficiency and low $NO_2$ production for ppb level NO under visible light. The invention also has applications in the field of environment pollution treatment.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural referents unless the context clearly dictates otherwise. Thus, for example, reference to "a reducing agent" includes reference to one or more of such materials and reference to "subjecting" refers to one or more such steps.

As used herein, the term "about" is used to provide flexibility and imprecision associated with a given term, metric or value. The degree of flexibility for a particular variable can be readily determined by one skilled in the art. However, unless otherwise enunciated, the term "about" generally connotes flexibility of less than 2%, and most often less than 1%, and in some cases less than 0.01%.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of." For example, "at least one of A, B and C" explicitly includes only A, only B, only C, and combinations of each.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Bismuth-Based Photocatalysts

Aiming at the problems in existing photocatalytic technology, the invention provides an effective preparation method and application of metal bismuth deposited bismuth-based photocatalyst, which not only has the advantages of simple operation and low price, but also presents excellent photocatalytic performance of high NO conversion efficiency and low $NO_2$ production.

Figure 1:
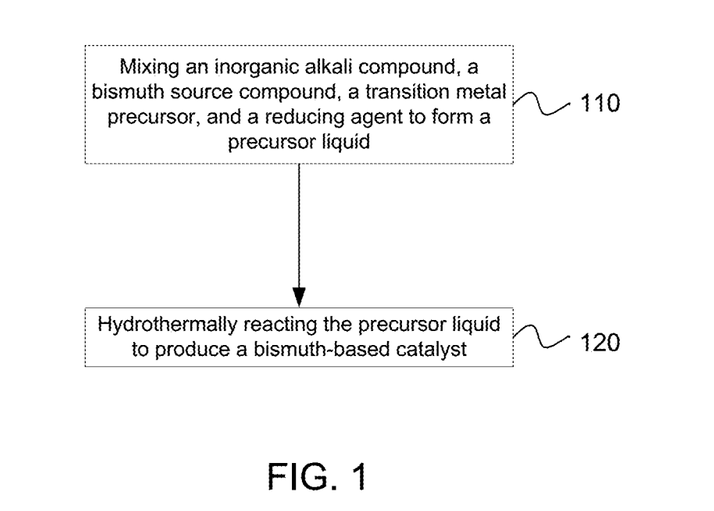
FIG. 1 is a flow chart of a method of forming a bismuth-based catalyst in accordance with one example.

Referring generally to FIG. 1, a preparation method 100 of the metal bismuth deposited bismuth-based photocatalyst of the present invention can include the following steps:

Step 1 (110). Mix an inorganic alkali compound, a bismuth source compound, a transition metal precursor, and a reducing agent in an aqueous solution to form a bismuth precursor liquid. The mixing can generally be performed to achieve a substantially uniformly mixed precursor liquid.

Step 2 (120). The precursor liquid can be subjected to hydrothermal reaction for a conversion time at a conversion temperature to produce the bismuth-based catalyst as a precipitate. The obtained precipitate can be washed and dried to obtain metal bismuth deposited bismuth-based photocatalyst.

The inorganic alkali compound can be any suitable base compound which is helpful to control the morphology and phase formation. Non-limiting examples of suitable alkali compounds include one or more of inorganic and organic bases such as potassium hydroxide, sodium hydroxide, urea, thiourea, and the like.

The transition metal precursor can be chosen in order to provide a catalytic substrate for the bismuth. Non-limiting examples of suitable transition metal precursors include tetrabutyl titanate ($C_{16}H_{36}O_4Ti$), titanium tetrachloride ($TiCl_4$), titanyl sulfate ($TiOSO_4 \cdot H_2SO_4 \cdot 8H_2O$), titanium sulfate ($Ti(SO_4)_2$), tantalum pentoxide ($Ta_2O_5$), tantalum chloride ($TaCl_5$), niobium pentoxide ($Nb_2O_5$), niobium(V) oxalate hydrate ($C_{10}H_5NbO_2O$), sodium niobium oxide ($NaNbO_3$), and the like.

The bismuth source compound can generally be a bismuth nitrate, bismuth hydroxide, bismuth acetate, or hydrate thereof. Non-limiting examples of suitable bismuth source compounds can include $Bi(NO_3)_3 \cdot 5H_2O$.

The reducing agent can be any compound which acts to reduce bismuth to form elemental metal. As a general guideline, the reducing agent can not react violently with water and added alkali. Non-limiting examples of suitable reducing agents can include hydrated hydrazine ($H_6N_2O$), sodium borohydride ($NaBH_4$), glucose ($C_6H_{12}O_6$), and ascorbic acid ($C_6H_8O_6$).

A molar ratio of the precursors to bismuth source compound in the precursor liquid can generally be greater than stoichiometric. For example, the molar ratio can be 1:1 to 12:1. $Bi(NO_3)_3 \cdot 5H_2O$ is (1-12):1 to obtain the precursor liquid;

As an example, the bismuth precursor liquid can also have a mass ratio of the inorganic alkali compound to the transition metal precursor of 0.4-12:0.2-6, although other ratios may be suitable. Due to different reducing agents with different reducing abilities, this range generally corresponds to the ratio of reducing agent to bismuth source and the ratio of bismuth source to transition metal during the experiment.

Similarly, a mass ratio of the reducing agent to the transition metal precursors in the precursor liquid can be (1.5-10):(0.2-6).

Again, as a general guideline only, the concentration of the inorganic alkali in the precursor solution can be 0.1-10 M.

The hydrothermal reaction can be carried out at the conversion temperature. Depending on desired rates and conditions, the precursor liquid can undergo hydrothermal reaction at 150-230° C.

In one example, the precursor liquid can be subjected to the hydrothermal reaction in a polytetrafluoroethylene tank. Optionally, a filling degree of the precursor liquid is (⅓)-(⅔)

of the tank volume. The tank can be heated to create a high temperature and high pressure reaction environment, thus insoluble substances are dissolved and recrystallized, which is called a hydrothermal method. This approach has the advantages of lower reaction temperature, simple process and relatively low cost. First, if bismuth is deposited on another kind of substrate, the substrate must first be obtained, which increases the process requirements. Second, the one-step hydrothermal method of adding reducing agents can produce other defects while Bi is reduced, which helps to improve the photocatalytic activity. Therefore, the one-step hydrothermal method can be more suitable for practical applications.

Following hydrothermal reaction to form the precipitate, the precipitate can be washed to remove any unreacted components and/or by-products other than the bismuth-based catalyst (i.e. with elemental bismuth deposited thereon and impregnated therein). The washed precipitate can be dried at 60-90° C. for 4-15 h, for example.

The metal bismuth deposited bismuth-based photocatalyst obtained from the preparation method of metal bismuth deposited bismuth-based photocatalyst according to any one of the above. In these cases, bismuth is uniformly dispersed on the surface of the layered Bi-based perovskite (Example 2), which belongs to the Aba2 space group (a=5.448 Å, b=5.411 Å, c=32.83 Å). The loading of bismuth broadens the photoresponse range and inhibits the recombination of photogenerated electrons and holes. In addition, the porous structure can provide more reactive sites in the process of photocatalytic reaction, and can improve the mass transfer efficiency of NO in the catalyst. We have prepared inexpensive and efficient photocatalytic NO conversion catalysts through simple methods, which have great practical application potential. Depending on the specific precursors and components chosen the bismuth-based catalyst can be $Bi@Bi_2Ti_2O_7$, $Bi@Bi_4Ti_3O_{12}$, $Bi@Bi_{12}TiO_{20}$, $Bi@Bi_5Nb_3O_{15}$, $Bi@BiNbO_4$, or $Bi@BiTaO_4$. If the type of transition metal, reaction temperature and holding time are varied accordingly, $Bi@BiFeO_3$, $Bi@Bi_2WO_6$ and $Bi@Bi_2MoO_6$ can be prepared by the above method. These materials can be in the form of a powder, particles, grains, nanosheets, films, bulk solid, or the like. As one example, these materials can be gray powders and the material prepared by hydrothermal method has the advantages of complete crystal grain development, small size, uniform distribution, and the particles are not easily agglomerated. The gray color is mainly due to the bismuth element deposited on the surface.

As a general guideline, the metal bismuth deposited bismuth-based photocatalyst can have a bismuth-transition metal oxide matrix in which elemental bismuth is impregnated. Some of the elemental bismuth will be exposed at outer surfaces of the material and at exposed surfaces within a porous structure of the material. Although process conditions can result in varied porosity, as a general guideline, the metal bismuth deposited bismuth-based photocatalyst can be relatively porous (e.g. 25.5 to 50.2 $m^2/g$). The elemental bismuth can also vary from about 2.5 to 45 vol or mass % of the total material. The three-dimensional structure can be self-assembled from nanosheets and is unique having excellent photocatalytic activity for converting NO and low conversion rate of $NO_2$. These materials have great practical application potential in the field of air pollutant treatment.

The metal bismuth deposited bismuth-based photocatalyst can be particularly useful in the conversion of NO. The bismuth-based catalyst can be exposed to air containing NO at an exposure temperature to convert at least a portion of the NO to various nitrogen redox products, e.g. $NO_3^-$, $NO_2^-$, $N_2$, $O_2$. One advantage of these materials is that photocatalytic activity can be readily achieved at ambient temperatures, and generally from about −20 to 38° C., however other temperatures can also be used. The prepared photocatalyst can be used for the conversion of indoor and outdoor NO in human residential areas and industrial and commercial areas. However, these photocatalysts can be used with other polluting gases including, but not limited to, formaldehyde and toluene, which are coated on the outer surface of walls like paint. The temperature for photocatalytic activity test is 20±3° C. and the relative humidity of the air is about 40%.

As previously noted, one advantage of these materials is the ability to readily convert NO when present at very low concentrations. For example, when the air has a NO concentration below 1 ppm and the portion of converted NO can be at least 60%. Photocatalytic activity can be based on SPR induced by exposure to a light source (e.g. sunlight, white light source, UV light, etc).

Figure 2:
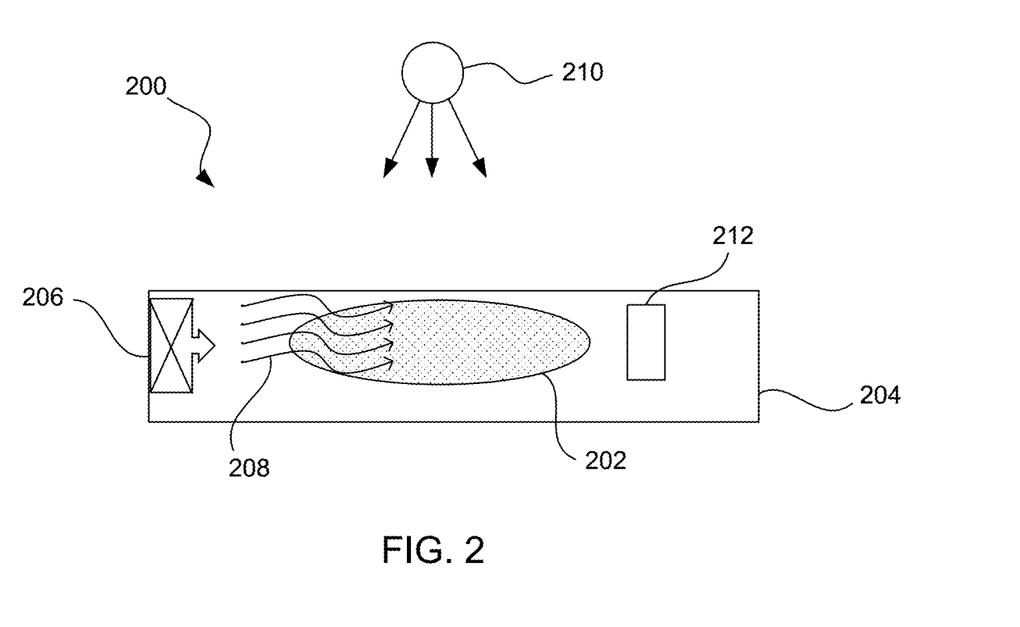
FIG. 2 is a schematic illustration of an NO conversion unit in accordance with one example.

Although configurations and device form factor can vary, as one example, FIG. 2 provides a schematic illustration of a NO conversion unit 200 which incorporates the bismuth-based photocatalyst 202 described herein. The bismuth-based photocatalyst 202 can be optionally secured to a device platform 204. Such securing can be made mechanically or chemically. As described previously, the bismuth-based photocatalyst can be provided as a sheet, particulate, or other form. Regardless, the bismuth-based photocatalyst can be physically exposed to a NO source. A blower 206 or other forced air device can be used to direct air 208 containing NO in contact with the bismuth-based catalyst. A suitable light source 210 can be provided to direct sufficient light to facilitate photocatalytic conversion of the NO in the air. Suitable light sources can include, but are not limited to, sun light, artificial fluorescent light, industrial high-pressure light sources such as xenon lamps, mercury lamps, sodium lamps, and the like. An optional NO sensor 212 can be oriented opposite the blower 206 in order to measure NO concentrations as a function of time and to evaluate performance of the NO conversion unit 200.

Bismuth uniformly deposited bismuth-based photocatalysts with large specific surface area can be prepared by a simple one-step hydrothermal method and these materials have high-efficiency photocatalytic conversion activity of ppb-NO conversion under visible light. The three-dimensional porous structure can improve mass transfer efficiency of NO in the catalyst. The one-step supported bismuth element broadens the photo response range and inhibits the recombination of photogenerated electrons and holes. In general, the efficient photocatalytic materials for photocatalytic conversion of NO and low conversion rate of $NO_2$ were obtained through a simple method. This structure and photocatalytic performance is unique, which is obtained by the one-step method described herein.

Compared with the prior art, the present invention has the following beneficial technical effects:

The invention discloses the preparation method of metal bismuth deposited bismuth-based photocatalyst. One-step hydrothermal method is used to prepare metal bismuth deposited bismuth-based photocatalyst, combining element bismuth with SPR effect and bismuth-based photocatalyst. $C_{16}H_{36}O_4Ti$, $TiOSO_4 \cdot H_2SO_4 \cdot 8H_2O$, $Ti(SO_4)_2$, $TiCl_4$, $Ta_2O_5$, $Nb_2O_5$, $TaCl_5$, $C_{10}H_5NbO_2O$, $NaNbO_3$, reducing agent, inorganic alkali and $Bi(NO_3)_3 \cdot 5H_2O$ are used to prepare precursors liquid and the molar ratio of the precursors to $Bi(NO_3)_3 \cdot 5H_2O$ is reasonably limited. Then a long-time hydrothermal reaction is carried out. Inorganic alkali acts as a mineralizer to make the precursors liquid form a product in a hydrothermal environment. The reducing agent can reduce the bismuth in the bismuth-based photocatalyst in the reactor. The SPR effect of metal bismuth can not only improve the utilization of visible light of the photocatalyst, but also can promote the separation of surface photogenerated carriers, which greatly enhances the efficiency of $NO_x$ removal of the metal bismuth deposited bismuth-based photocatalyst under visible light.

The metal bismuth deposited bismuth-based photocatalyst provided by the present invention has high NO conversion efficiency and low $NO_2$ production, and has excellent stability.

EXAMPLES

The metal bismuth deposited bismuth-based photocatalyst of the present invention specifically includes the following steps:

S1: Adding 0.4-12 g of inorganic alkali to 30-100 mL of deionized water to make the concentration reach 0.1-10 M with stirring at 20-50° C. for 0.5-5 h to obtain solution A, and the inorganic alkali is potassium hydroxide or sodium hydroxide.

S2: Adding 0.2-6 g of the precursors to the solution A obtained in S1 with stirring at 20-50° C. for 5-30 min to get suspension B, and the precursors are $C_{16}H_{36}O_4Ti$, $TiCl_4$, $Ta_2O_5$, $Nb_2O_5$.

S3: $Bi(NO_3)_3 \cdot 5H_2O$ is slowly added to the suspension B obtained in S2 with stirring at 20-50° C. for 5-30 min to obtain suspension C, and the molar ratio of the precursors to $Bi(NO_3)_3 \cdot 5H_2O$ in S2 is (1-12):1;

S4: Adding 1.5-10 g of reducing agent to mixed suspension C with stirring at 20-50° C. for 10-60 min to obtain precursor suspension, and the reducing agents are $H_6N_2O$, $NaBH_4$, $C_6H_{12}O_6$ or $C_6H_8O_6$;

S5: Taking 20-40 mL of the precursor solution obtained in S4 and put it into 20-100 mL polytetrafluoroethylene tank to make the filling degree in the range of 1/3-2/3. Then carrying out the hydrothermal reaction at 150-230° C. for 10-50 h, and collect the precipitate after the PTFE tank is cooled;

S6: Washing the obtained precipitate with deionized water and absolute ethanol for 5 times, and then drying at 60-90° C. for 4-15 h to obtain the metal bismuth deposited bismuth-based photocatalyst.

The above-mentioned metal bismuth deposited bismuth-based photocatalyst can be used for photocatalytic removal NO, so it can be applied in the field of environmental protection.

Example 1

The present invention discloses the preparation method of $Bi@Bi_2Ti_2O_7$, and the method includes the following steps:

S1: Adding 0.5 g of sodium hydroxide to 30 mL of deionized water to make the concentration reach 0.42 M with stirring at 25° C. for 1 h to obtain solution A;

S2: Adding 1.12 g of the $C_{16}H_{36}O_4Ti$ to the solution A obtained in S1 with stirring at 25° C. for 30 min to get suspension B; P S3: 1.59 g of $Bi(NO_3)_3 \cdot 5H_2O$ is slowly added to the suspension B obtained in S2 with stirring at 25° C. for 15 min to obtain suspension C, so that the molar ratio of $C_{16}H_{36}O_4Ti$ to $Bi(NO_3)_3 \cdot 5H_2O$ in S2 is 1:1;

S4: Adding 2 g of $C_6H_8O_6$ to mixed suspension C obtained in S3 with stirring at 25° C. for 20 min to obtain suspension D;

S5: Taking 20 mL of the suspension D obtained in S4 and put it into 50 mL polytetrafluoroethylene tank. Then carrying out the hydrothermal reaction at 180° C. for 20 h, and collect the precipitate after the PTFE tank is cooled;

S6: Washing the obtained precipitate with deionized water and absolute ethanol for 5 times, and then drying at 60° C. for 15 h to obtain $Bi@Bi_2Ti_2O_7$.

Photocatalytic Performance Experiment:

The photocatalytic performance of the prepared samples was evaluated by photocatalytic oxidation of ppb level NO under visible light irradiation. A 300 W xenon lamp with cut-off filter ($\lambda > 420$ nm) is used as simulated visible light source, which is placed vertically above the reactor. At the same time, the mixed gas of NO and air is controlled by the flow controller to flow through the surface of the photocatalyst in glass reactor with volume of 0.785 L. The $NO_x$ analyzer (model Thermo Scientific, 42i) is used to continuously record the concentration of NO and $NO_2$ every minute.

Example 2

The present invention discloses the preparation method of $Bi@Bi_4Ti_3O_{12}$, and the method includes the following steps:

S1: Adding 2 g of sodium hydroxide to 40 mL of deionized water to make the concentration reach 1.25 M with stirring at 30° C. for 1 h to obtain solution A;

S2: Adding 1.12 g of the $TiCl_4$ to the solution A obtained in S1 with stirring at 25° C. for 30 min to get suspension B;

S3: 3.192 g of $Bi(NO_3)_3 \cdot 5H_2O$ is slowly added to the suspension B obtained in S2 with stirring at 30° C. for 30 min to obtain suspension C, so that the molar ratio of $TiCl_4$ to $Bi(NO_3)_3 \cdot 5H_2O$ in S2 is 3:4;

S4: Adding 1.13 g of $H_6N_2O$ to mixed suspension C obtained in S3 with stirring at 25° C. for 20 min to obtain suspension D;

S5: Taking 40 mL of the suspension D obtained in S4 and put it into 100 mL polytetrafluoroethylene tank. Then carrying out the hydrothermal reaction at 210° C. for 20 h, and collect the precipitate after the PTFE tank is cooled;

S6: Washing the obtained precipitate with deionized water and absolute ethanol for 5 times, and then drying at 80° C. for 20 h to obtain $Bi@Bi_4Ti_3O_{12}$.

Figure 3:
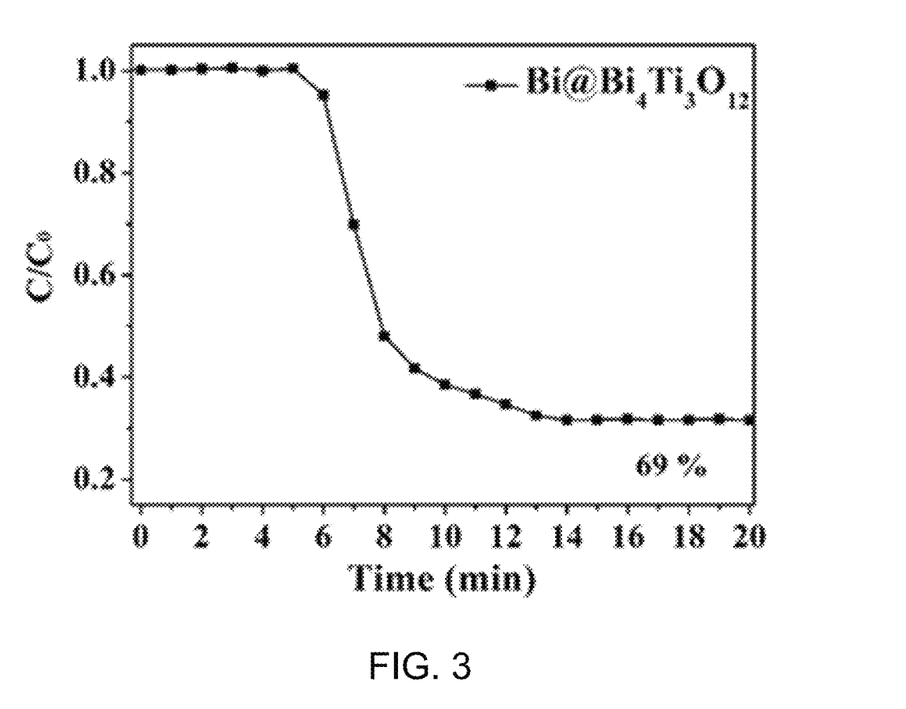
FIG. 3 is a graph of the photocatalytic NO removal curve of $Bi@Bi_4Ti_3O_{12}$ obtained in Example 2 of the present invention.
Figure 4:
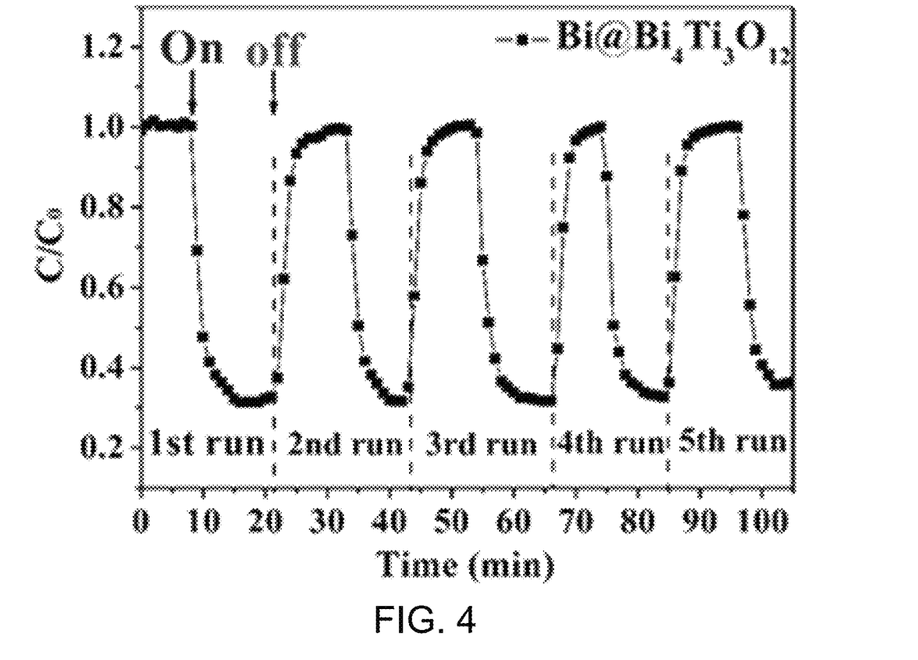
FIG. 4 is a graph of a stability experiment of $Bi@Bi_4Ti_3O_{12}$ photocatalytic removal of NO obtained in Example 2 of the present invention.
Figure 5:
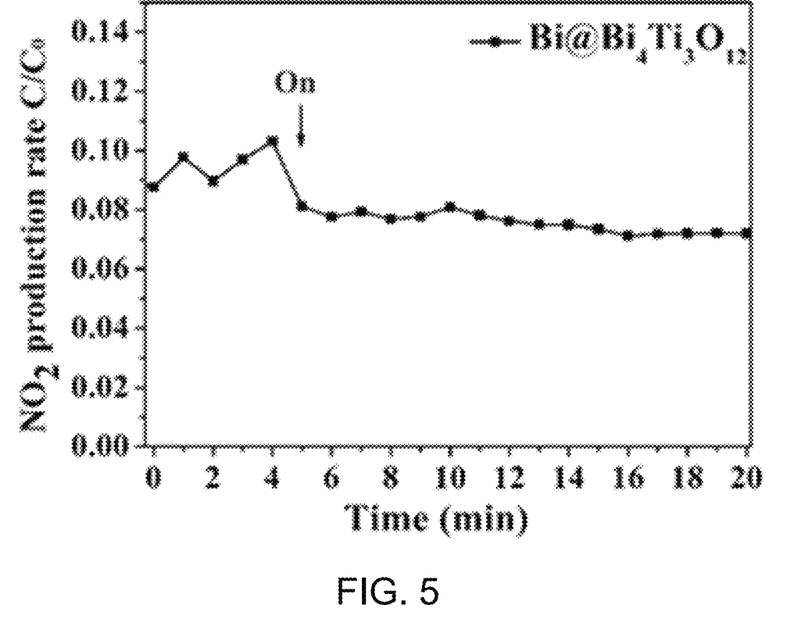
FIG. 5 is a graph showing the production of $NO_2$ during the photocatalytic removal of NO by $Bi@Bi_4Ti_3O_{12}$ obtained in Example 2 of the present invention.
Figure 6:
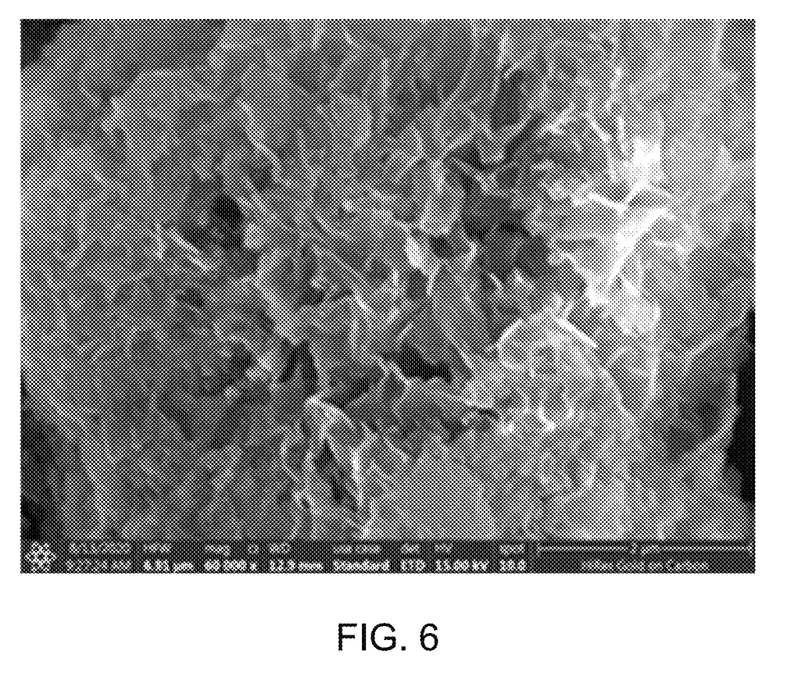
FIG. 6 is an SEM image of $Bi@Bi_4Ti_3O_{12}$ obtained in Example 2 of the present invention.

FIG. 3 is a graph showing the photocatalytic NO removal curve of $Bi@Bi_4Ti_3O_{12}$ obtained in this example. In FIG. 3, $Bi@Bi_4Ti_3O_{12}$ has a photocatalytic NO removal efficiency of 69% under visible light ($\lambda > 420$ nm). FIG. 4 is a corresponding graph of the stability experiment of $Bi@Bi_4Ti_3O_{12}$ photocatalytic removal of NO for this example. In FIG. 4, the $NO_2$ production over $Bi@Bi_4Ti_3O_{12}$ is only 8% during the photocatalytic removal of NO under visible light ($\lambda > 420$ nm). FIG. 5 shows the production of $NO_2$ during the photocatalytic removal of NO by $Bi@Bi_4Ti_3O_{12}$ obtained in this example. In FIG. 5, the NO conversion efficiency over $Bi@Bi_4Ti_3O_{12}$ can still reach 66% after five cycles of experiments under visible light ($\lambda > 420$ nm), evincing excellent stability of the invented photocatalyst. FIG. 6 is an SEM image of $Bi@Bi_4Ti_3O_{12}$ obtained showing that this $Bi@Bi_4Ti_3O_{12}$ has a porous structure, which can provide many reactive sites in the photocatalytic process.

Example 3

The present invention discloses the preparation method of $Bi@Bi_{12}TiO_{20}$, and the method includes the following steps:

S1: Adding 2.5 g of potassium hydroxide to 40 mL of deionized water to make the concentration reach 1.11 M with stirring at 30° C. for 30 min to obtain solution A;

S2: Adding 0.2 g of the $C_{16}H_{36}O_4Ti$ to the solution A obtained in S1 with stirring at 30° C. for 10 min to get suspension B;

S3: 3.192 g of $Bi(NO_3)_3 \cdot 5H_2O$ is slowly added to the suspension B obtained in S2 with stirring at 30° C. for 20 min to obtain suspension C, and the molar ratio of $C_{16}H_{36}O_4Ti$ to $Bi(NO_3)_3 \cdot 5H_2O$ in S2 is 1:12;

S4: Adding 3.8 g of $C_6H_{12}O_6$ to mixed suspension C obtained in S3 with stirring at 30° C. for 20 min to obtain suspension D;

S5: Taking 40 mL of the suspension D obtained in S4 and put it into 100 mL polytetrafluoroethylene tank. Then carrying out the hydrothermal reaction at 200° C. for 15 h, and collect the precipitate after the PTFE tank is cooled;

S6: Washing the obtained precipitate with deionized water and absolute ethanol for 5 times, and then drying at 70° C. for 10 h to obtain $Bi@Bi_4Ti_3O_{12}$.

Example 4

The present invention discloses the preparation method of $Bi@Bi_5Nb_3O_{15}$, and the method includes the following steps:

S1: Adding 2.5 g of potassium hydroxide to 40 mL of deionized water to make the concentration reach 1.11 M with stirring at 35° C. for 30 min to obtain solution A;

S2: Adding 0.87 g of the $Nb_2O_5$ to the solution A obtained in S1 with stirring at 30° C. for 10 min to get suspension B;

S3: 3.192 g of $Bi(NO_3)_3 \cdot 5H_2O$ is slowly added to the suspension B obtained in S2 with stirring at 35° C. for 20 min to obtain suspension C, so that the molar ratio of $Nb_2O_5$ to $Bi(NO_3)_3 \cdot 5H_2O$ in S2 is 10:3;

S4: Adding 0.79 g of $NaBH_4$ to mixed suspension C obtained in S3 with stirring at 35° C. for 15 min to obtain suspension D;

S5: Taking 40 mL of the suspension D obtained in S4 and put it into 100 mL polytetrafluoroethylene tank. Then carrying out the hydrothermal reaction at 220° C. for 15 h, and collect the precipitate after the PTFE tank is cooled;

S6: Washing the obtained precipitate with deionized water and absolute ethanol for 5 times, and then drying at 70° C. for 10 h to obtain $Bi@Bi_5Nb_3O_{15}$.

Example 5

The present invention discloses the preparation method of $Bi@BiTaO_4$, and the method includes the following steps:

S1: Adding 2.5 g of sodium hydroxide to 60 mL of deionized water to make the concentration reach 1.04 M with stirring at 30° C. for 30 min to obtain solution A;

S2: Adding 1.45 g of the $Ta_2O_5$ to the solution A obtained in S1 with stirring at 30° C. for 15 min to get suspension B;

S3: 3.192 g of $Bi(NO_3)_3 \cdot 5H_2O$ is slowly added to the suspension B obtained in S2 with stirring at 30° C. for 20 min to obtain suspension C, so that the molar ratio of $Ta_2O_5$ to $Bi(NO_3)_3 \cdot 5H_2O$ in S2 is 1:2;

S4: Adding 0.79 g of $NaBH_4$ to mixed suspension C obtained in S3 with stirring at 30° C. for 20 min to obtain suspension D;

S5: Taking 40 mL of the suspension D obtained in S4 and put it into 100 mL polytetrafluoroethylene tank. Then carrying out the hydrothermal reaction at 210° C. for 20 h, and collect the precipitate after the PTFE tank is cooled;

S6: Washing the obtained precipitate with deionized water and absolute ethanol for 5 times, and then drying at 70° C. for 10 h to obtain $Bi@BiTaO_4$.

Table 1 summarizes NO removal and NO2 production for Examples 1-5.

TABLE 1

Photocatalytic NO removal and $NO_2$ production of examples 1 to 5

| Photocatalysts | NO removal efficiency | $NO_2$ production |
|---|---|---|
| Example 1 | 69% | 8% |
| Example 2 | 65% | 10% |
| Example 3 | 66% | 9% |
| Example 4 | 65% | 8% |
| Example 5 | 63% | 7% |

Example 6

Examples 1 and 2 were compared to other photocatalysts for NO removal as reported in Table 2.

TABLE 2

Comparison of photocatalysts for NO removal ($\lambda > 420$ nm)

| Photocatalysts | NO removal efficiency ($\lambda > 420$ nm) | References |
|---|---|---|
| $Bi@Bi@Bi_4Ti_3O_{12}$ | 65% | Example 2 |
| $Bi@Bi_2Ti_2O_7$ | 69% | Example 1 |
| $Bi/Bi_2O_3/Bi_2WO_6$-0.8 | 55.4% | 1 |
| Bi-Ti-50 | 48.2% | 2 |
| $Bi/(BiO)_2CO_3$ | 63.6% | 3 |
| $Bi/(BiO)_2CO_3$-5 | 58% | 4 |
| $Bi@Bi_2O_2SiO_3$-3 | 50.2% | 5 |
| 12% BP/MBWO | 67% | 6 |
| Pt@N-Doped $(BiO)_2CO_3$ | 43.3% | 7 |

As can be seen, the NO removal efficiency of the Example 1 and 2 materials are superior to those produced by earlier methods.

REFERENCES

1. He, W. J.; Sun, Y. J.; Jiang, G. M. et al. Activation of amorphous $Bi_2WO_6$ with synchronous Bi metal and $Bi_2O_3$ coupling: Photocatalysis mechanism and reaction pathway. *Applied Catalysis B: Environmental*, 2018, 232, 340-347.
2. Zhao, Z. W.; Zhang, W. D.; Dong, F. et al. Noble metal-free Bi nanoparticles supported on $TiO_2$ with plasmon-enhanced visible light photocatalytic air purification. *Environmental Science Nano*, 2016, 3, 1306-1317.
3. Sun, Y. J.; Zhao, Z. W.; Dong, F. et al. Plasmonic Bi metal as cocatalyst and photocatalyst: the case of $Bi/(BiO)_2CO_3$ and Bi particles. *Journal of Colloid & Interface Science*, 2017, 485, 1-10.
4. Dong, F.; Li, Q. Y.; Ho, W. et al. Noble metal-like behavior of plasmonic Bi particles as a cocatalyst deposited on $(BiO)_2CO_3$ microspheres for efficient visible light photocatalysis. *ACS Catalysis*, 2014, 4, 4341-4350.
5. Li, X. W.; Zhang, W. D.; Li, J. Y.; Dong, F. et al. Transformation pathway and toxic intermediates inhibition of photocatalytic NO removal on designed Bi metal@defective $Bi_2O_2SiO_3$. *Applied Catalysis B: Environmental*, 2018, 241, 187-195.
6. Hu, J. D.; Chen, D. Y.; Liu, J. M. et al. Z-Scheme 2D/2D heterojunction of black phosphorus/monolayer $Bi_2WO_6$ nanosheets with enhanced photocatalytic activities. *Angewandte Chemie International Edition*, 2019, 58, 2073-2077.

7. Dong, X.; Zhang, W. D.; Dong, F. et al. Pt quantum dots deposited on N-doped $(BiO)_2CO_3$: enhanced visible light photocatalytic NO removal and reaction pathway. *Catalysis Science & Technology*, 2017, 7, 1324-1332.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A method of forming a bismuth-based catalyst, comprising:
   a) mixing an inorganic alkali compound, a bismuth source compound, a transition metal precursor, and a reducing agent in an aqueous solution to form a bismuth precursor liquid, wherein one or more of
      i. the bismuth source compound is one or more of bismuth nitrate, bismuth hydroxide, bismuth acetate, or hydrate thereof,
      ii. the transition metal precursor is one or more of tetrabutyl titanate ($C_{16}H_{36}O_4Ti$), titanium tetrachloride ($TiCl_4$), tantalum pentoxide ($Ta_2O_5$) and niobium pentoxide ($Nb_2O_5$), and
      iii. the reducing agent is one or more of hydrated hydrazine ($H_6N_2O$), sodium borohydride ($NaBH_4$), glucose ($C_6H_{12}O_6$), and ascorbic acid ($C_6H_8O_6$); and
   b) hydrothermally reacting the bismuth precursor liquid at a conversion temperature for a conversion time to produce the bismuth-based catalyst.

2. The method of claim 1, wherein the inorganic alkali compound is one or more of potassium hydroxide, sodium hydroxide, urea and thiourea.

3. The method of claim 1, wherein the bismuth source compound is $Bi(NO_3)_3 \cdot 5H_2O$.

4. The method of claim 1, wherein the bismuth precursor liquid has a molar ratio of the transition metal precursor to the bismuth source compound of 1:1 to 12:1.

5. The method of claim 1, wherein the bismuth precursor liquid has a mass ratio of the inorganic alkali compound to the transition metal precursor of 0.4-12:0.2-6.

6. The method of claim 1, wherein the bismuth precursor liquid has a second mass ratio of the reducing agent to the transition metal precursor of 1.5-10:0.2-6.

7. The method of claim 1, wherein the bismuth precursor liquid has an inorganic alkali compound concentration of 0.1-10 M.

8. The method of claim 1, wherein the conversion time is from 10 to 50 hours.

9. The method of claim 1, wherein the conversion temperature is from 150 to 230° C.

10. The method of claim 1, wherein the bismuth-based catalyst is one or more of Bi@$Bi_2Ti_2O_7$, Bi@$Bi_4Ti_3O_{12}$, Bi@$Bi_{12}TiO_{20}$, Bi@$Bi_5Nb_3O_{15}$, Bi@$BiNbO_4$, or Bi@$BiTaO_4$.

11. A method of converting NO to a nitrogen redox product, comprising exposing the bismuth-based catalyst of claim 1 to air containing NO at an exposure temperature to convert at least a portion of the NO to the nitrogen redox product.

12. The method of claim 11, wherein the nitrogen redox product is one or more of $HNO_3$, $N_2O$, $HNO_2$, and $N_2$.

13. The method of claim 11, wherein the exposure temperature is −20 to 38° C.

14. The method of claim 11, wherein the air has an NO concentration below 1 ppm and the portion is at least 50%.

15. A method of forming a bismuth-based catalyst, comprising:
   a) mixing an inorganic alkali compound, a bismuth source compound, a transition metal precursor, and a reducing agent in an aqueous solution to form a bismuth precursor liquid wherein one or more of
      i. the bismuth precursor liquid has a molar ratio of the transition metal precursor to the bismuth source compound of 1:1 to 12:1,
      ii. the bismuth precursor liquid has a mass ratio of the inorganic alkali compound to the transition metal precursor of 0.4-12:0.2-6, and
      iii. the bismuth precursor liquid has a second mass ratio of the reducing agent to the transition metal precursor of 1.5-10:0.2-6; and
   b) hydrothermally reacting the bismuth precursor liquid at a conversion temperature for a conversion time to produce the bismuth-based catalyst.

* * * * *